US011527987B2

(12) United States Patent
Inoue et al.

(10) Patent No.: US 11,527,987 B2
(45) Date of Patent: Dec. 13, 2022

(54) ABNORMALITY DIAGNOSIS DEVICE AND ABNORMALITY DIAGNOSIS METHOD

(71) Applicant: Mitsubishi Electric Corporation, Tokyo (JP)

(72) Inventors: Hiroshi Inoue, Tokyo (JP); Makoto Kanemaru, Tokyo (JP); Junji Hori, Tokyo (JP); Tomoaki Takewa, Tokyo (JP); Takuma Sasai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/291,278

(22) PCT Filed: Dec. 27, 2018

(86) PCT No.: PCT/JP2018/048221
§ 371 (c)(1),
(2) Date: May 5, 2021

(87) PCT Pub. No.: WO2020/136823
PCT Pub. Date: Jul. 2, 2020

(65) Prior Publication Data
US 2022/0006417 A1    Jan. 6, 2022

(51) Int. Cl.
*H02P 29/028* (2016.01)
*H02P 29/40* (2016.01)

(52) U.S. Cl.
CPC .......... *H02P 29/028* (2013.01); *H02P 29/40* (2016.02)

(58) Field of Classification Search
CPC .... H02P 29/028; H02P 29/40; F05D 2260/80; F04B 51/00
See application file for complete search history.

(56) References Cited

U.S. PATENT DOCUMENTS 9,569,901 B2 *   2/2017  Ito ..................... B60W 50/0205
2003/0009311 A1 * 1/2003  Ushiku ................... F04D 19/04
                                                          702/184

(Continued)

FOREIGN PATENT DOCUMENTS

JP    2000-298511 A    10/2000
JP    2002-285974 A    10/2002
(Continued)

OTHER PUBLICATIONS

International Search Report and Written Opinion dated Mar. 26, 2019, received for PCT Application No. PCT/JP2018/048221, Filed on Dec. 27, 2018, 7 pages including English Translation.

(Continued)

*Primary Examiner* — Bickey Dhakal
(74) *Attorney, Agent, or Firm* — Xsensus LLP

(57) ABSTRACT

Provided is an abnormality diagnosis device including: a physical quantity measurement processor configured to acquire, as time-series data, a physical quantity of an electric motor or a load; a feature parameter calculation processor configured to calculate feature parameters; a correlation function creation processor configured to create a correlation function for two or more feature parameters, and calculate a correlation coefficient corresponding to a measurement result of the physical quantity that changes depending on an abnormality occurrence state; a database configured to store in advance reference data in which a remaining time until a failure is caused and the correlation coefficient are associated with each other; and a diagnosis processor configured to extract from the reference data the remaining time corresponding to the correlation coefficient, and identify the remaining time until the electric motor or the load causes a failure or a part that has caused a failure.

18 Claims, 9 Drawing Sheets

(56) References Cited

U.S. PATENT DOCUMENTS

| | | | |
|---|---|---|---|
| 2003/0153997 A1 | 8/2003 | Samata et al. | |
| 2004/0143418 A1* | 7/2004 | Ushiku | G01M 13/00 |
| | | | 702/184 |
| 2009/0119029 A1* | 5/2009 | Voigtlaender | G05B 19/4065 |
| | | | 702/34 |
| 2009/0276165 A1* | 11/2009 | Weiss | H02P 27/00 |
| | | | 702/34 |
| 2019/0369596 A1* | 12/2019 | Kamiguchi | G05B 19/4065 |
| 2022/0088802 A1* | 3/2022 | Kanada | G06F 3/147 |

FOREIGN PATENT DOCUMENTS

| | | |
|---|---|---|
| JP | 2003-074478 A | 3/2003 |
| JP | 2003-232705 A | 8/2003 |
| JP | 2006-161677 A | 6/2006 |
| JP | 2018-033516 A | 3/2018 |
| JP | 2018-155543 A | 10/2018 |

OTHER PUBLICATIONS

Notice of Reasons for Refusal dated Aug. 6, 2019, received for Japanese Application 2019-530223, 9 pages including English Translation.

Taiwan Examination Report dated Sep. 3, 2020, received for Taiwan Application 108146648, 14 pages including English Translation.

\* cited by examiner

ABNORMALITY DIAGNOSIS DEVICE AND ABNORMALITY DIAGNOSIS METHOD

CROSS-REFERENCE TO RELATED APPLICATION

The present application is based on PCT filing PCT/JP2018/048221, filed Dec. 27, 2018, the entire contents of which are incorporated herein by reference.

TECHNICAL FIELD

The present invention relates to: an abnormality diagnosis device configured to perform an abnormality diagnosis for identifying a remaining time until an electric motor and a load cause a failure; and an abnormality diagnosis method therefor.

BACKGROUND ART

In order to operate a production line at high capacity, it is important to minimize the number of times of replacement of components relating to an electric motor and a load.

For example, one of causes of production stagnation in the production line of semiconductor devices is a failure of a vacuum pump. When the vacuum pump fails, there arise problems of, for example, destruction of a semiconductor device due to deterioration of the degree of vacuum and a halt of the production line due to the replacement of components.

As a related art for avoiding such problems, there is a compressor inspection device capable of identifying presence or absence of an abnormality and a cause of the abnormality through use of pulsation information on, for example, vibrations, a sound, a current, and a voltage that are generated in a compressor (see, for example, Patent Literature 1).

The compressor inspection device as described in Patent Literature 1 is configured to compare the pulsation information that can be acquired after the compressor starts activation with pulsation-related normal data stored in advance to determine whether the compressor is normal or abnormal.

CITATION LIST

Patent Literature

[PTL 1] JP 2006-161677 A

SUMMARY OF INVENTION

Technical Problem

However, the compressor inspection device as described in Patent Literature 1 can identify that a compressor to be inspected has become abnormal, but cannot identify how long its operation can be continued until the compressor becomes abnormal.

In order to avoid a problem in that a production line is stopped due to a failure of an apparatus to be inspected, it is conceivable to periodically replace constituent components of the apparatus before the apparatus causes a failure. However, when a component having more time remaining before its failure is replaced at the periodic replacement, there arise other problems in that a replacement cost increases and the number of times that the production line is stopped due to the replacement increases. Therefore, in order to raise the utilization rate of the production line, it is important to detect the deterioration state of the apparatus before the apparatus becomes abnormal, and to identify how long the operation of the apparatus can be continued until the apparatus becomes abnormal. It is also important to identify a part that has caused a failure.

The present invention has been made to solve the above-mentioned problems, and an object thereof is to obtain an abnormality diagnosis device and an abnormality diagnosis method that are capable of identifying a remaining time until an electric motor and a load to be diagnosed cause an abnormality or a part that has caused a failure.

Solution to Problem

According to one embodiment of the present invention, there is provided an abnormality diagnosis device including: a physical quantity measurement unit configured to acquire, as time-series data, a measured value of a physical quantity that changes depending on an abnormality occurrence state of an electric motor or a load; a feature parameter calculation unit configured to calculate two or more feature parameters based on the physical quantity acquired as the time-series data; a correlation function creation unit configured to create a correlation function for two or more feature parameters included in the two or more feature parameters, and calculate from the correlation function a correlation coefficient corresponding to a measurement result of the physical quantity that changes depending on the abnormality occurrence state; a database unit configured to store in advance reference data in which a remaining time until the electric motor or the load causes a failure and the correlation coefficient are associated with each other; and a diagnosis unit configured to extract from the reference data the remaining time corresponding to the correlation coefficient calculated by the correlation function creation unit, and identify the remaining time until the electric motor or the load causes a failure or a part that has caused a failure, to thereby perform an abnormality diagnosis of the electric motor or the load.

Further, according to one embodiment of the present invention, there is provided an abnormality diagnosis method including the steps of: acquiring, as time-series data, a measured value of a physical quantity that changes depending on an abnormality occurrence state of an electric motor or a load; calculating two or more feature parameters based on the physical quantity acquired as the time-series data; creating a correlation function for two or more feature parameters included in the two or more feature parameters, and calculating from the correlation function a correlation coefficient corresponding to a measurement result of the physical quantity that changes depending on the abnormality occurrence state; causing a database unit to store in advance reference data in which a remaining time until the electric motor or the load causes a failure and the correlation coefficient are associated with each other; and performing an abnormality diagnosis of the electric motor or the load by extracting from the reference data the remaining time corresponding to the correlation coefficient calculated in the step of calculating a correlation coefficient and identifying the remaining time until the electric motor or the load causes a failure or a part that has caused a failure.

Advantageous Effects of Invention

According to the present invention, it is possible to obtain the abnormality diagnosis device and the abnormality diagnosis method that are capable of identifying the remaining time until the electric motor and the load to be diagnosed cause the abnormality or the part that has caused the failure.

DESCRIPTION OF EMBODIMENTS

Referring to the accompanying drawings, an abnormality diagnosis device and an abnormality diagnosis method according to preferred embodiments of the present invention are now described.

First Embodiment

Figure 1:
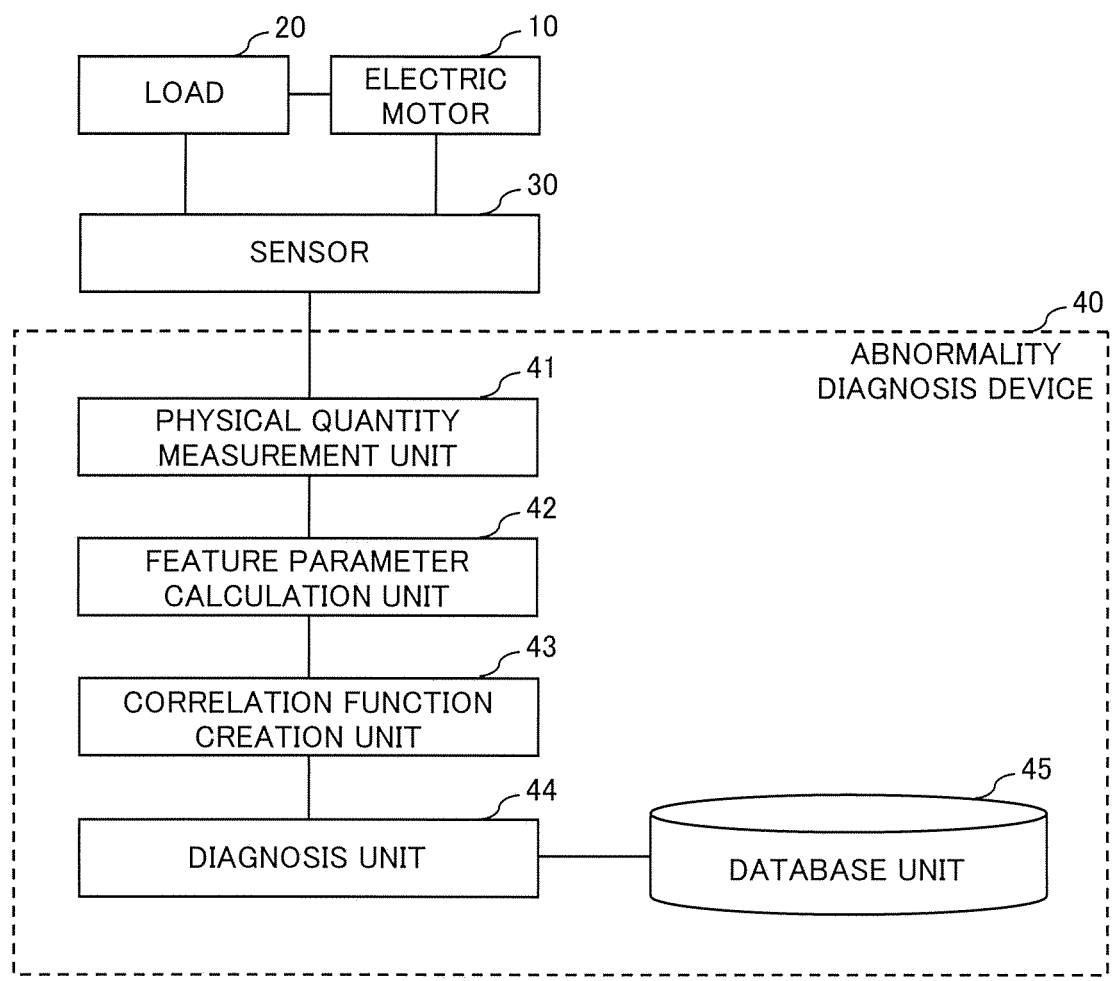
FIG. 1 is a functional block diagram of an abnormality diagnosis device according to a first embodiment of the present invention.

FIG. 1 is a functional block diagram of an abnormality diagnosis device according to a first embodiment of the present invention. An abnormality diagnosis device 40 according to this first embodiment is connected to a sensor 30 connected to an electric motor 10 and a load 20. In this case, the load 20 corresponds to a constituent element that consumes energy emitted from the electric motor 10. For example, a chemical vapor deposition (CVD) chamber described later with reference to FIG. 3 corresponds to the load 20.

The sensor 30 is configured to detect a physical quantity that changes depending on an abnormality occurrence state of the electric motor 10 and the load 20 as a measured value. Specific examples of the physical quantity include a current flowing through the electric motor 10, a temperature of the electric motor 10, and vibrations of the electric motor 10.

The abnormality diagnosis device 40 according to this first embodiment includes a physical quantity measurement unit 41, a feature parameter calculation unit 42, a correlation function creation unit 43, a diagnosis unit 44, and a database unit 45.

The physical quantity measurement unit 41 is configured to acquire a physical quantity including the current detected by the sensor 30 as time-series data. The feature parameter calculation unit 42 is configured to calculate two or more feature parameters from the physical quantity acquired as the time-series data by the physical quantity measurement unit 41. The feature parameters are described later in detail based on specific application examples.

The correlation function creation unit 43 is configured to create a correlation function for two or more feature parameters included in the two or more feature parameters. The correlation function creation unit 43 is not limited to a case of creating one correlation function, and can create a plurality of correlation functions. The correlation function creation unit 43 is also configured to calculate a correlation coefficient corresponding to a measurement result of the physical quantity that changes depending on the abnormality occurrence state based on the created correlation function. The correlation function and the correlation coefficient are described later in detail based on specific application examples.

The database unit 45 is configured to store in advance reference data in which a remaining time until the electric motor 10 or the load 20 causes a failure and the correlation coefficient are associated with each other. In this case, the remaining time until a failure is caused quantitatively indicates an operating time until the electric motor 10 and the load 20 to be diagnosed become abnormal, and is an index value of its life span.

The database unit 45 stores the reference data individually for each part of the electric motor 10 to be subjected to an abnormality diagnosis. In the same manner, the database unit 45 stores the reference data individually for each part of the load 20 to be subjected to an abnormality diagnosis. The reference data is described later in detail based on a specific application example.

The diagnosis unit 44 is configured to extract the remaining time corresponding to the correlation coefficient calculated by the correlation function creation unit 43 from the reference data stored in the database unit 45, to thereby identify the remaining time until the electric motor 10 or the load 20 causes a failure. That is, the diagnosis unit 44 identifies the remaining time corresponding to the correlation coefficient calculated by the correlation function creation unit 43 for each part based on the reference data for each part to be subjected to the abnormality diagnosis, to thereby quantitatively diagnose the life span of the electric motor 10 and the load 20.

The diagnosis unit 44 is also configured to output an alarm including information relating to the abnormal part and the life span when the identified remaining time becomes equal to or less than an alarm determination time set in advance. When the abnormality diagnosis device 40 includes an alarm display unit, the diagnosis unit 44 causes the alarm display unit to display the abnormal part and the life span.

Figure 2:
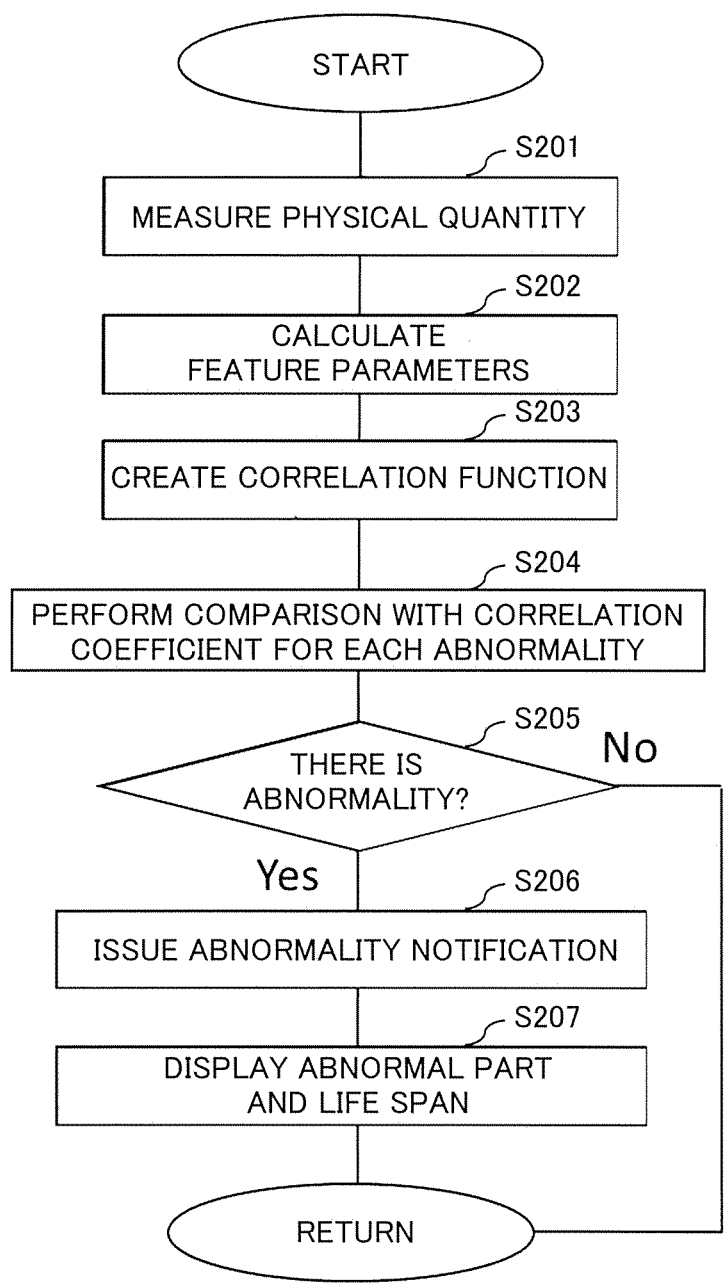
FIG. 2 is a flow chart for illustrating a series of abnormality diagnosis processing steps in the abnormality diagnosis device according to the first embodiment of the present invention.

FIG. 2 is a flow chart for illustrating a series of abnormality diagnosis processing steps in the abnormality diagnosis device according to the first embodiment of the present invention. In Step S201, the physical quantity measurement unit 41 measures the physical quantity that changes depending on the abnormality occurrence state of the electric motor 10 or the load 20 as the time-series data through intermediation of the sensor 30. Subsequently, in Step S202, the feature parameter calculation unit 42 calculates the feature parameters.

Subsequently, in Step S203, the correlation function creation unit 43 creates a correlation function, and calculates the correlation coefficient from the created correlation function. Subsequently, in Step S204, the diagnosis unit 44 compares the correlation coefficient calculated in Step S203 and the correlation coefficient included in the reference data stored in the database unit 45 with each other to identify the remaining time until the electric motor 10 or the load 20 causes a failure for each part to be subjected to the abnormality diagnosis.

Subsequently, in Step S205, the diagnosis unit 44 determines whether or not the identified remaining time has become equal to or less than the alarm determination time set in advance. When it is determined that the identified remaining time is equal to or less than the alarm determination time, the procedure advances to Step S206, and when it is determined that the identified remaining time is not equal to or less than the alarm determination time, the series of processing steps is brought to an end.

When the procedure advances to step S206, the diagnosis unit 44 issues an abnormality notification relating to the abnormal part and the life span. In addition, when the abnormality diagnosis device 40 includes an alarm display unit, in Step S207, the diagnosis unit 44 displays the abnormal part and the life span, and brings the series of processing steps to an end.

Next, application examples of the abnormality diagnosis device are described. Specific examples of a factor that causes an abnormality in the electric motor 10 or the load 20 include accumulated matter adhering to a vacuum pump, a vacuum leak in a vacuum chamber, belt bending in a belt conveyor, cracking, and foreign matter accumulated in a fan.

In view of this, a metal organic chemical vapor deposition (MOCVD) apparatus being a semiconductor manufacturing apparatus is used as an application example of the abnormality diagnosis device to describe details of an abnormality diagnosis. The MOCVD apparatus uses a dry vacuum pump, and measures the current as the physical quantity, to thereby perform the abnormality diagnosis of the dry vacuum pump and the load.

Figure 3:
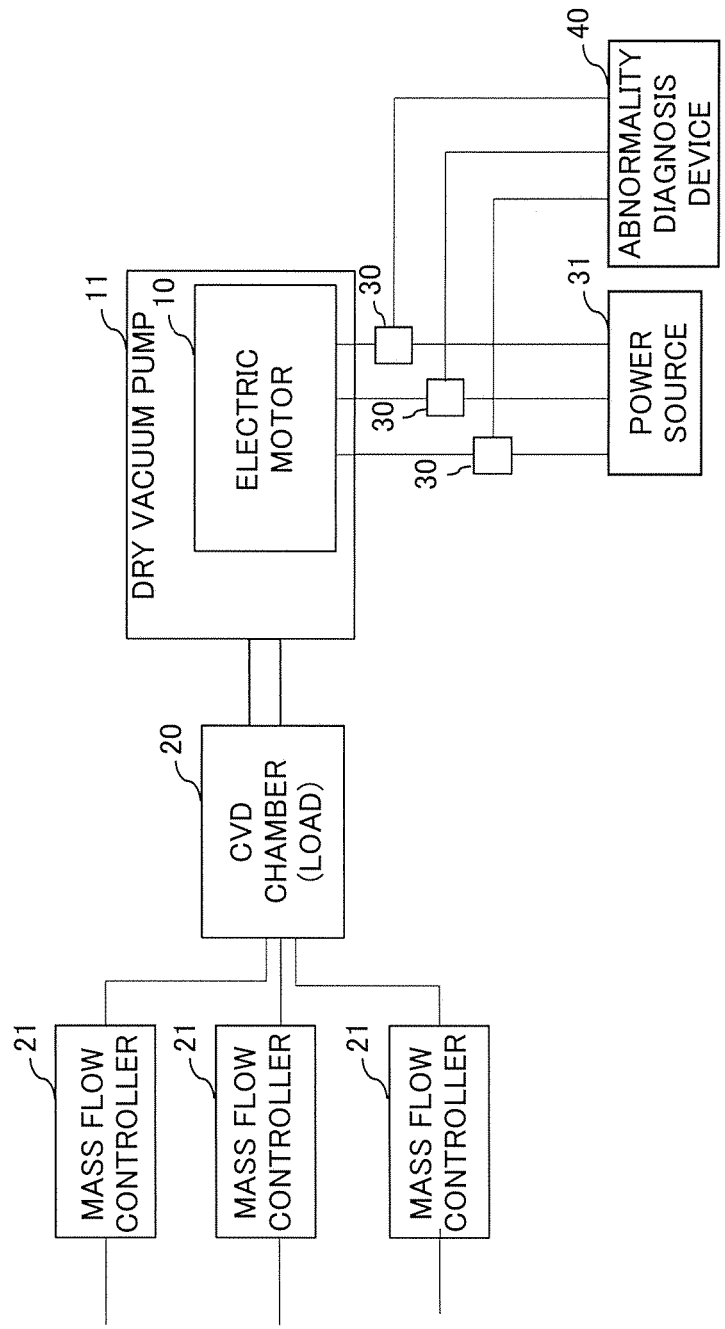
FIG. 3 is a schematic diagram of a case in which the abnormality diagnosis device according to the first embodiment of the present invention is applied to a diagnosis of an MOCVD apparatus.

FIG. 3 is a schematic diagram of a case in which the abnormality diagnosis device according to the first embodiment of the present invention is applied to a diagnosis of the MOCVD apparatus. The MOCVD apparatus illustrated in FIG. 3 includes a dry vacuum pump 11 configured to perform vacuuming and a CVD chamber being the load 20 having a sealed structure capable of vacuum evacuation. A vacuum pipe is connected to the evacuation side of the CVD chamber, and a gate valve is connected to the evacuation side of the vacuum pipe.

In addition, a vacuum pipe is connected to the evacuation side of the gate valve. The electric motor 10 being a Roots-type dry pump is connected to the evacuation side of the vacuum pipe in order to evacuate the inside of the CVD chamber. The gate valve isolates the CVD chamber and the dry vacuum pump as required to adjust a conductance.

Meanwhile, a plurality of gas pipes are connected to the CVD chamber, and are connected to respective mass flow controllers 21. Various raw material gases and carrier gases that are introduced into the CVD chamber have flow rates controlled by the mass flow controllers 21.

When the dry vacuum pump is in operation, the gas is transported to the evacuation side by the rotation of the electric motor 10. The electric motor 10 is driven by three-phase alternating currents, and is connected to a power source 31 through use of current cables. The current sensor 30 is attached to one or a plurality of cables among the three-phase alternating current cables.

The current sensor 30 is configured to measure a current value at a set frequency. The frequency is set as a frequency at which the order of about 10 points in one cycle of an alternating current can be measured. For example, when a commercial power source is used, the frequency of the current is 60 Hz. In view of this, when a measurement frequency is set to 1 kHz, the current sensor 30 can acquire a current value at 1,000/60=16 points per cycle. The current value measured by the current sensor 30 is acquired by the physical quantity measurement unit 41 included in the abnormality diagnosis device 40 to be stored in the feature parameter calculation unit 42.

Figure 4:
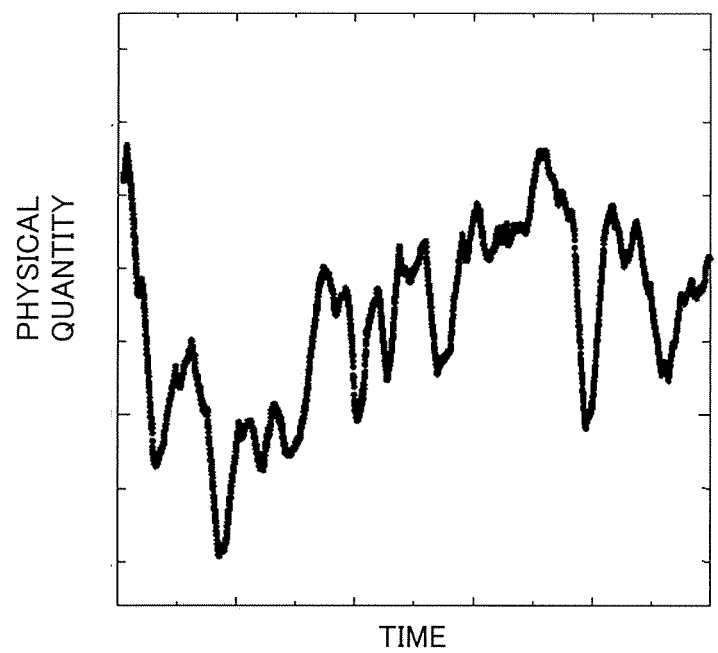
FIG. 4 is a graph for showing measurement results of current values acquired by a physical quantity measurement unit in the first embodiment of the present invention.

FIG. 4 is a graph for showing measurement results of current values acquired by the physical quantity measurement unit 41 in the first embodiment of the present invention. The physical quantity measurement unit 41 acquires the current values as the time-series data based on the measurement frequency.

The feature parameter calculation unit 42 calculates the feature parameters from the current values acquired as the time-series data. A method of calculating the feature parameters based on a specific procedure is described below. First, the feature parameter calculation unit 42 calculates an effective value of the current from the time-series data on the current value. The calculation of the effective value requires a plurality of consecutive current values, namely, time-series data on the current.

It is assumed that the measurement point of the current to be used in the calculation of the effective value is "n", and a measurement start point is "m". The value "n" is set to be the same as the number of points measured at a time being an integral multiple of a cycle period of the alternating current (corresponding to, for example, a period of L/60 seconds using an integer L when the frequency of the power source is 60 Hz). A current value measured between "m" and m+n is expressed as Ii, where "i" is an integer between "m" and m+n. In this case, the feature parameter calculation unit 42 calculates the effective value I_effective as in Expression (1).

$$\text{I\_effecitve} = \sqrt{\frac{1}{n}\sum_{i=m}^{m+n} I_i^2} \quad (1)$$

The value calculated as a current effective value between "m" and m+1n by the feature parameter calculation unit 42 in this manner is expressed as an effective value I_effective$_1$. For the subsequent pieces of time-series data, the feature parameter calculation unit 42 calculates I_effective in order as in an effective value I_effective$_2$ between m+1n and m+2n, an effective value I_effective$_3$ between m+2n and m+3n, and so on. As a result, the feature parameter calculation unit 42 can calculate a plurality of effective values I_effective from the time-series data on the measured current values. This is defined as a set of I_effective, and it is assumed that "n" effective values I_effective have been calculated.

Subsequently, the feature parameter calculation unit 42 creates feature parameters from the calculated effective values I_effective. When the feature parameters are to be created, the feature parameter calculation unit 42 uses "n" effective values I_effective, namely, the effective value I_effective$_1$ to an effective value I_effective$_n$. Examples of the feature parameters include a maximum, a minimum, an average, a variance, a skewness, a kurtosis, and a median value. The feature parameters are defined as a maximum I_max, a minimum I_min, an average I_average, a variance I_stedvp, a skewness I_skewness, a kurtosis i_kurtosis, and a median value I_center, respectively.

The maximum I_max, the minimum I_min, and the median value I_center are calculated as the maximum value, the minimum value, and the median value, respectively, of the "n" effective values of from the effective value I_effective$_1$ to the effective value I_effective$_n$. In addition, the other feature parameters are calculated as in Expressions (2) to (5), respectively, through use of the "n" effective values I_effective.

$$\text{I\_average} = \frac{1}{n}\sum_{i=1}^{n} \text{I\_effective}_i \quad (2)$$

$$\text{I\_stedvp} = \sqrt{\frac{1}{n}(\text{I\_effective}_i - \text{I\_average})^2} \quad (3)$$

$$\text{I\_skewness} = \frac{1}{n}\sum_{i=1}^{n} \frac{(\text{I\_effective}_i - \text{I\_average})^3}{\text{I\_stedvp}} \quad (4)$$

$$\text{I\_kurtosis} = \frac{1}{n}\sum_{i=1}^{n} \frac{(\text{I\_effective}_i - \text{I\_average})^4}{\text{I\_stedvp}} \quad (5)$$

Figure 5:
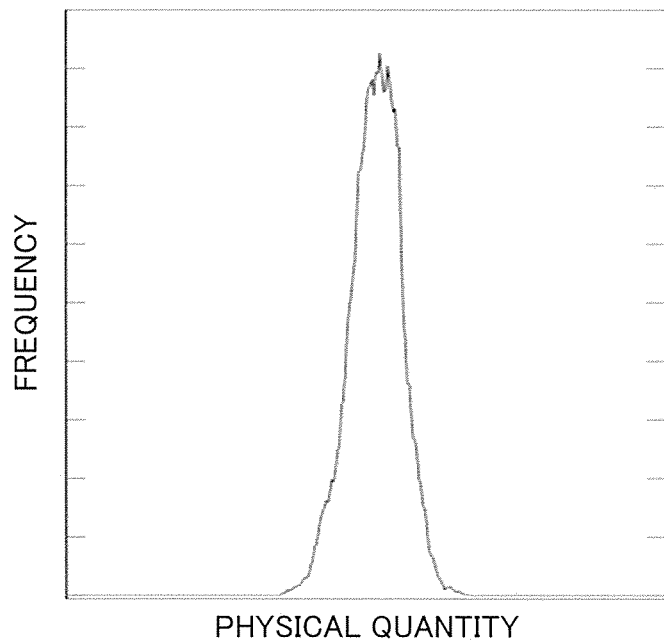
FIG. 5 is a graph for showing a shape of a histogram of current effective values in the first embodiment of the present invention.

As described above, the feature parameter calculation unit 42 can calculate each of feature parameters from "n" effective values I_effective. Each of those feature parameters indicates a shape of a histogram of the effective values I_effective. FIG. 5 is a graph for showing the shape of the histogram of the current effective values I_effective in the first embodiment of the present invention. The feature parameter calculation unit 42 can calculate a plurality of feature parameters of each type by repeatedly executing a cycle of acquiring "n" effective values I_effective and calculating the feature parameter.

The correlation function creation unit 43 creates a correlation function through use of a plurality of calculation results relating to each feature parameter. The creation of the correlation function to be performed when two feature parameters of the average and the variance are selected from the two or more feature parameters is described below. The correlation function creation unit 43 plots all the averages I_average and the variances I_stedvp that are calculated as the two feature parameters on the vertical axis and the horizontal axis of the graph, respectively.

The correlation function creation unit 43 performs function fitting on the plotted data. A linear function is used as an example of the function. Examples of the function fitting include a least-square method for a measurement point. The function fitting based on the least-square method is performed on the plotted data, to thereby express the linear function of the average I_average and the variance I_stedvp as Expression (6).

$$I_{stedvp} = a_{ij} * I_{average} + b_{ij} \quad (6)$$

Figure 6:
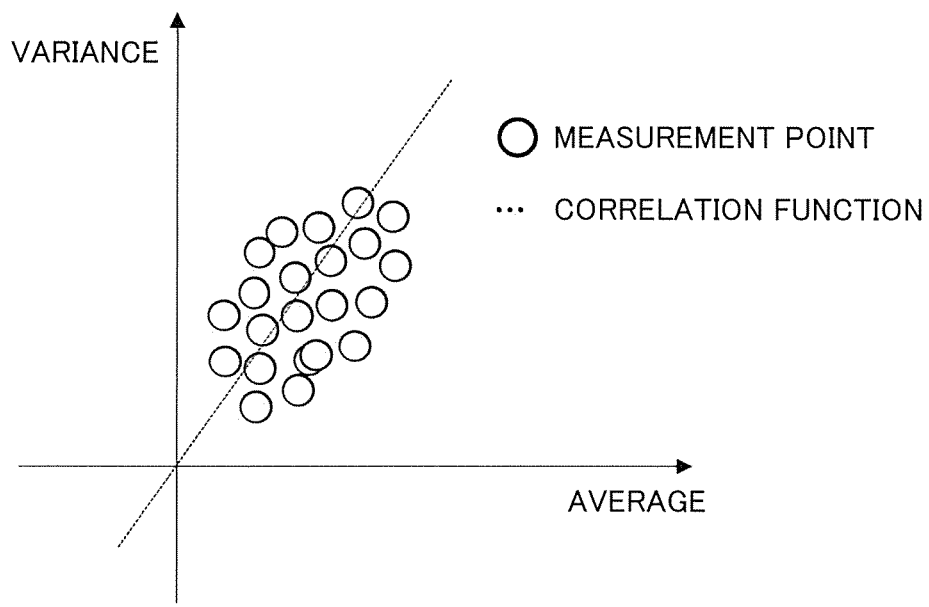
FIG. 6 is a graph for showing a plot example of a correlation function obtained when an average and a variance are employed as two feature parameters in the first embodiment of the present invention.

FIG. 6 is a graph for showing a plot example of the correlation function obtained when the average I_average and the variance I_stedvp are employed as the two feature parameters in the first embodiment of the present invention. In this case, subscripts "i" and "j" are determined from the feature parameters used for creating the correlation function. For example, assuming that the average I_average is 1 and the variance I_stedvp is 2, Expression (6) is expressed as Expression (7).

$$I_{stedvp} = a_{12} * I_{average} + b_{12} \quad (7)$$

The correlation function creation unit 43 can create all such correlation functions for combinations of other parameters, namely, for all combinations that satisfy i<j. Coefficients $a_{ij}$ and $b_{ij}$ that are created in such a manner are defined as the correlation coefficients.

Subsequently, the diagnosis unit 44 performs an abnormality diagnosis through use of the created correlation coefficients. In order to perform the abnormality diagnosis through use of the created correlation coefficients, it is required to use basic data indicating a relationship between the correlation coefficients and the remaining time until a failure is caused. In view of this, a method of storing such basic data in the database unit 45 is described below.

Figure 7:
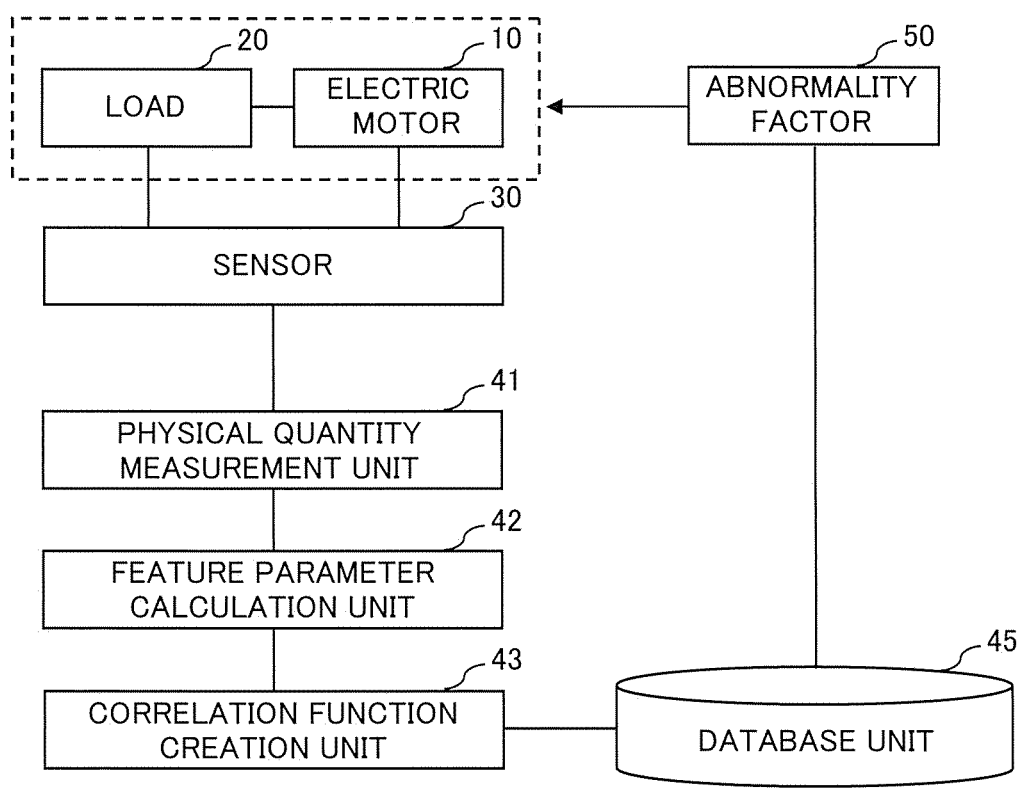
FIG. 7 is a diagram for illustrating a device configuration that can be used for storing reference data in a database unit in the first embodiment of the present invention.

FIG. 7 is a diagram for illustrating a device configuration that can be used for storing the reference data in the database unit 45 in the first embodiment of the present invention. In order to store the reference data, it is possible to use the physical quantity measurement unit 41, the feature parameter calculation unit 42, the correlation function creation unit 43, and the database unit 45 included in the abnormality diagnosis device 40.

When the reference data is collected, an abnormality factor 50 is quantitatively generated in each of parts of the electric motor 10 and the load 20 in advance.

For example, when solid matter is accumulated on a bearing as the abnormality factor 50, the accumulation amount is quantitatively changed to change an abnormal state, to thereby collect various kinds of data for the reference data. The electric motor 10 is driven under a given abnormal state, and the current value is acquired as the physical quantity at that time. Then, conversion into the effective values and the creation of the feature parameters can be performed by the same method as that used at the time of the abnormality diagnosis described above with reference to the flow chart of FIG. 2. The feature parameters for a given abnormal amount can be calculated based on those steps, and the results of the calculation are stored in the database unit 45.

Figure 8:
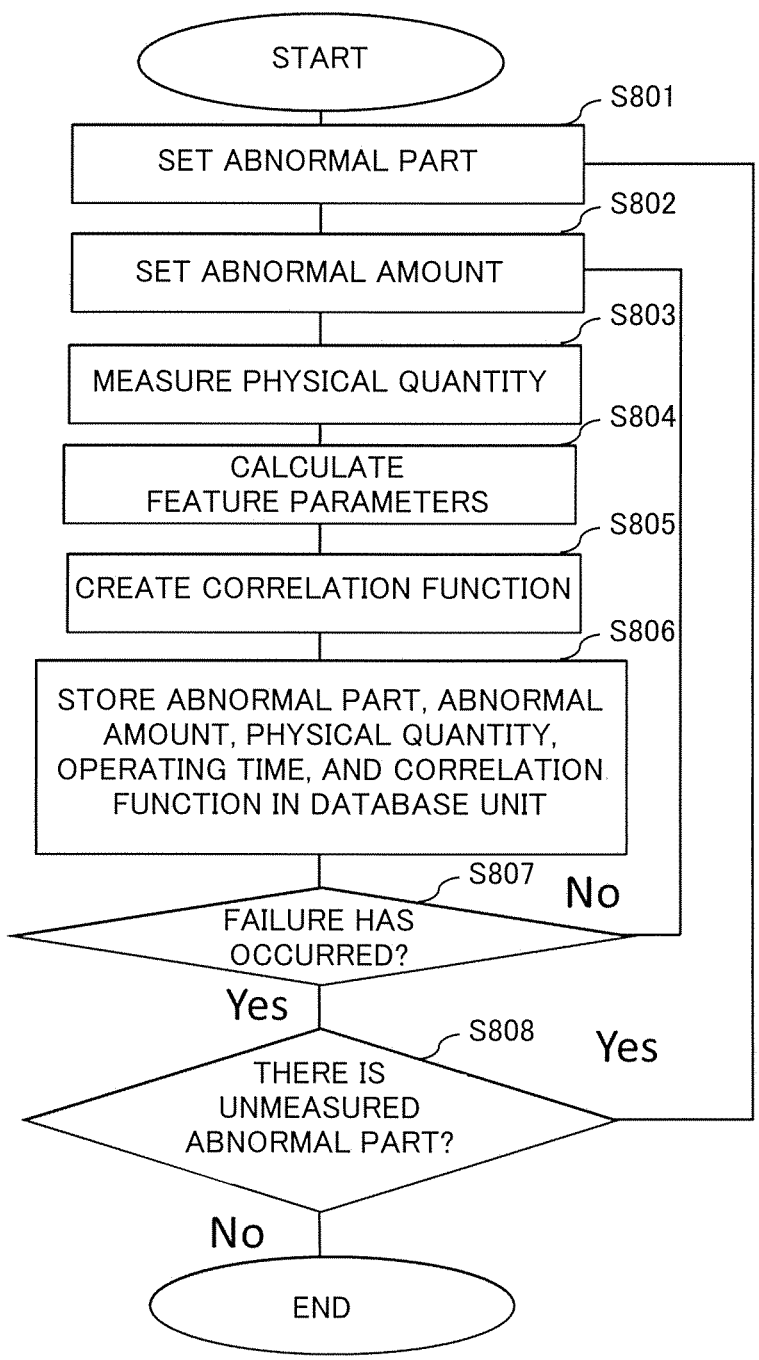
FIG. 8 is a flow chart for illustrating a series of processing steps for storing the reference data for performing an abnormality diagnosis in the database unit in the first embodiment of the present invention.

FIG. 8 is a flow chart for illustrating a series of processing steps for storing the reference data for performing the abnormality diagnosis in the database unit 45 in the first embodiment of the present invention. In Step S801, an operator sets the abnormal part of the electric motor 10 or the load 20 to be subjected to the abnormality diagnosis. For example, the bearing of the electric motor 10 is set as the abnormal part.

Subsequently, in Step S802, the operator sets the abnormal amount as the abnormality factor 50. For example, the abnormal amount is set by quantitatively providing the accumulation amount of the solid matter to the bearing.

Subsequently, in Step S803, the physical quantity measurement unit 41 measures the physical quantity that changes depending on the abnormality occurrence state of the electric motor 10 or the load 20 as the time-series data through intermediation of the sensor 30. For example, the physical quantity measurement unit 41 measures the physical quantity by acquiring the time-series data relating to the current value of the electric motor 10 through intermediation of the sensor 30 under the state in which the abnormal quantity is set in Step S802.

Subsequently, in Step S804, the feature parameter calculation unit 42 calculates the feature parameters. For example, the feature parameter calculation unit 42 calculates the feature parameters relating to the variance and the average from the time-series data on the current value as described above with reference to FIG. 6.

Subsequently, in Step S805, the correlation function creation unit 43 creates the correlation function, and calculates the correlation coefficients. For example, as described above with reference to FIG. 6, the correlation function creation unit 43 creates the correlation function relating to the variance and the average, and calculates the correlation coefficients from the created correlation function.

Subsequently, in Step S806, the correlation function creation unit 43 stores in the database unit 45 data in which the abnormal part, the abnormal amount, the physical quantity, the operating time of the electric motor, and the correlation function are associated with one another based on the processing results of Step S801 to Step S805.

Subsequently, in Step S807, the operator determines whether or not a failure has occurred in the abnormal part. When it is determined that no failure has occurred, the procedure returns to Step S802, and the setting of the abnormal amount is further changed to repeatedly perform the processing from Step S802 to Step S807 until a failure occurs.

When it is determined in Step S807 that a failure has occurred, the procedure advances to Step S808, and the operator determines whether or not there is an abnormal part for which the data has not been measured. When it is determined that there is an abnormal part for which the data has not been measured, the procedure advances to Step S801 to set the new abnormal part, and then the processing from Step S802 to Step S807 is repeatedly performed.

Then, in Step S808, when it is determined that there is no abnormal part for which the data has not been measured, the series of processing steps is brought to an end. Such a procedure enables the data to be collected for each desired abnormal part.

It is also required to separately acquire a relationship between the accumulation amount and the remaining time until a failure is caused. This data acquisition is executed by operating the electric motor 10 for a long time and periodically measuring the abnormal amount in a part that may cause the abnormality and the date and time at that time. The operation is continued to obtain a difference between the timing of the failure and the date and time at that time, to thereby be able to determine the remaining time until the failure is caused with respect to the abnormal amount in the abnormal part. In addition, when abnormalities occur in a plurality of parts, abnormalities other than an abnormality in a part of interest are periodically removed, to thereby be able to more accurately obtain the relationship between the abnormal amount in the part of interest and the remaining time until the failure is caused.

The important data in the abnormality diagnosis is the data obtained immediately before the failure, for example, one day to one month before the failure. In this case, the relationship between the abnormal amount in each part and the timing of the failure is already stored in the database unit 45 by executing the series of processing steps illustrated in FIG. 8. In view of this, the operator can measure the abnormal amount and the remaining time until the failure is caused from a state involving the occurrence of the abnormal amount multiplied by, for example, 0.9 as a coefficient for obtaining an abnormal amount smaller than the abnormal amount at the time of the failure. As a result, it becomes possible to acquire the relationship between the remaining time until a failure is caused and the abnormal amount in a shorter period of time.

When such a method capable of collecting data in a short time as described above is used, the data can be collected under a state in which an abnormality in another part can be ignored. Therefore, such a method is useful as the method of acquiring the relationship between the abnormal amount in a single part and the remaining time until a failure is caused.

With the above-mentioned methods, it is possible to acquire two kinds of relationships, namely, the relationship between the abnormal amount and the correlation coefficients of the feature parameters and the relationship between the abnormal amount and the remaining time until a failure is caused. As the reference data to be used for an actual abnormality diagnosis, it is required to use a relationship between the correlation coefficients of the feature parameter and the remaining time until a failure is caused. In view of this, a method of acquiring the reference data having this relationship is described below.

As a specific example, the abnormal amount corresponding to a correlation coefficient "a" of the feature parameter of the current is defined as an abnormal amount "w". The remaining time until a failure is caused with respect to the abnormal amount "w" is defined as a remaining time "t". A relationship between the correlation coefficient "a" and the remaining time "t" can be found from a relationship between the correlation coefficient "a" and the abnormal amount "w" and a relationship between the remaining time "t" and the abnormal amount "w". In this manner, the relationship between the correlation coefficient "a" of the feature parameter of the current and the remaining time "t" until a failure is caused can be found from the two kinds of relationships. In view of this, the operator can finally store in the database unit 45 the reference data in which the correlation coefficient "a" and the remaining time "t" until a failure is caused are associated with each other.

In addition, in order to perform the abnormality diagnosis, an alarm determination time t_alarm is set in advance, to thereby be able to output an alarm when the remaining time "t" becomes equal to or less than the alarm determination time t_alarm or less. For example, one month is set as the alarm determination time t_alarm, to thereby enable the diagnosis unit 44 to output an alarm as a result of the abnormality diagnosis of the abnormal part under a state in which the remaining time "t" is equal to or less than one month. The alarm determination time t_alarm is stored in the database unit 45 for each abnormal part.

Figure 9:
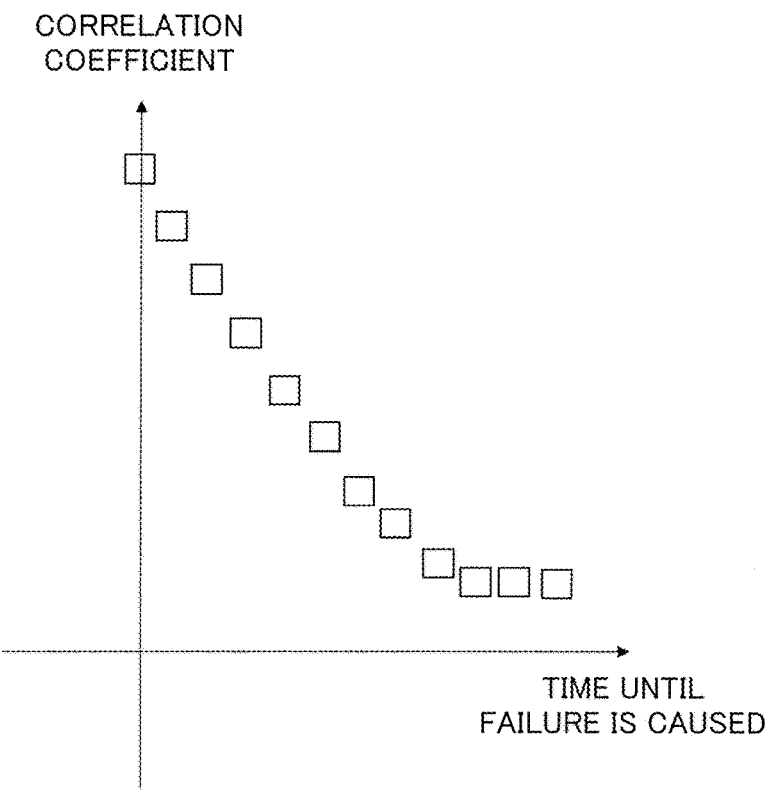
FIG. 9 is a graph for showing a relationship between a correlation coefficient and a remaining time until a failure is caused in the first embodiment of the present invention.

FIG. 9 is a graph for showing a relationship between the correlation coefficient and the remaining time until a failure is caused in the first embodiment of the present invention. The relationship shown in FIG. 9 is stored in the database unit 45 as the reference data to be utilized as the data serving as a determination criterion at the time of the abnormality diagnosis. That is, when the diagnosis unit 44 performs the abnormality diagnosis, the diagnosis unit 44 extracts the remaining time corresponding to the correlation coefficient calculated by the correlation function creation unit 43 from the reference data in the database unit 45, to thereby be able to identify a remaining time until a failure part causes a failure.

As a specific example of the abnormality diagnosis of the electric motor 10, the abnormality of the bearing of the electric motor 10 is described in detail. The solid matter generated by having the vacuum pump cooled when a gas passes is accumulated on the bearing of the electric motor 10. After the solid matter is accumulated, a load torque increases when a spot at which the solid matter is accumulated is brought into contact with the electric motor 10 being rotated. The current value is proportional to the load torque, and hence the current value also increases in accordance with the increase in load torque. That is, as the volume of the solid matter increases, an average value being one of the feature parameters of the current value increases.

In addition, the contact between the spot at which the solid matter is accumulated and the electric motor 10 being rotated occurs only in a partial segment during the rotation of the electric motor 10. Therefore, the current values are no longer constant. That is, as more solid matter is accumulated, the variance being one of the feature parameters of the current values increases.

Figure 10:
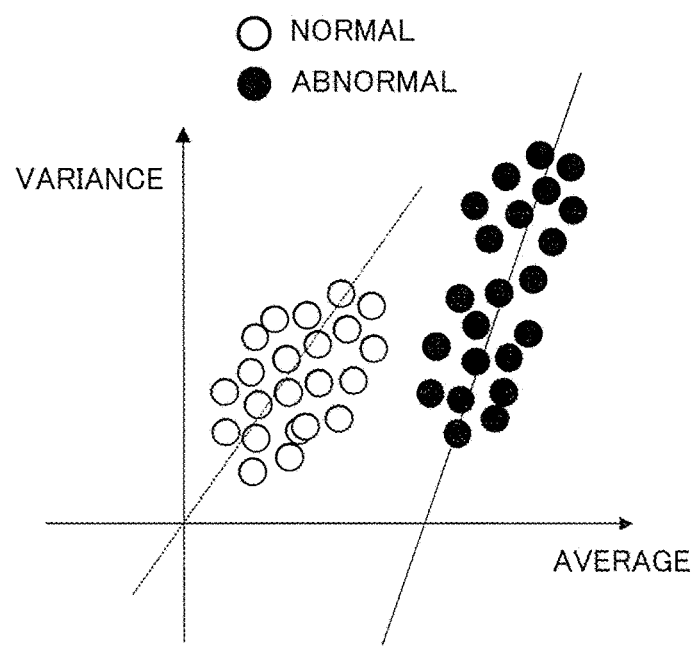
FIG. 10 is a graph for showing correlations between an average and a variance of current values obtained at a normal operation and at the time of generation of accumulated matter on a bearing in the first embodiment of the present invention.

FIG. 10 is a graph for showing correlations between the average and the variance of the current values obtained at a normal operation and at the time of the generation of the accumulated matter on the bearing in the first embodiment of the present invention. As shown in FIG. 10, as the remaining time until a failure is caused becomes shorter, a correlation coefficient $a_{12}$ corresponding to a slope of a linear function increases, and a correlation coefficient $b_{12}$ corresponding to an intercept of the linear function decreases.

Figure 11:
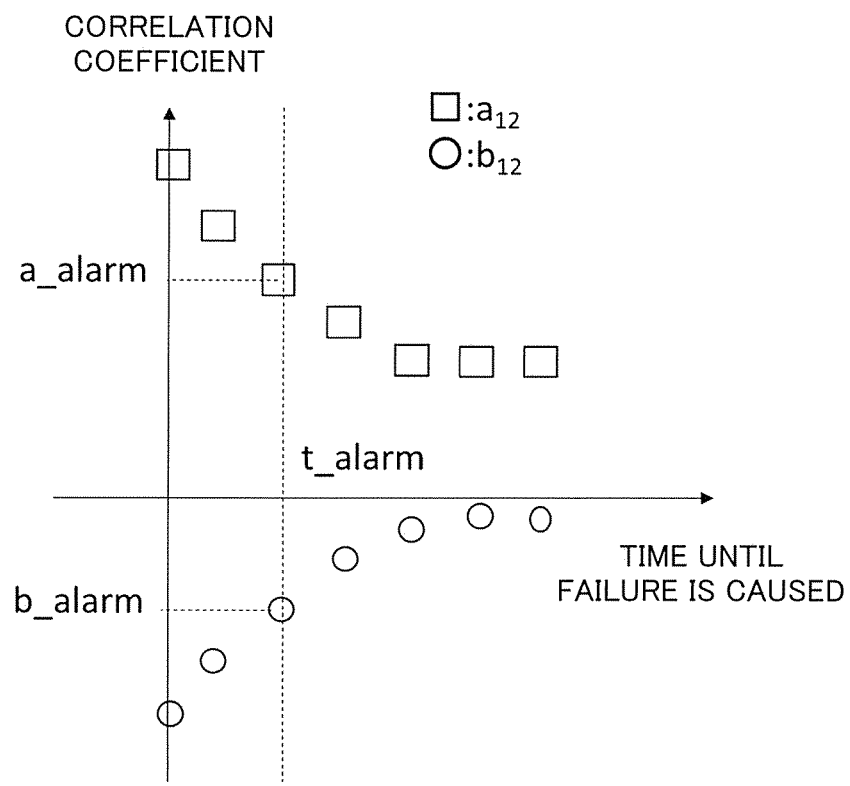
FIG. 11 is a graph for showing relationships between correlation coefficients and the remaining time until a failure is caused which are obtained when the generation of the accumulated matter on the bearing is set as an abnormality factor in the first embodiment of the present invention.

FIG. 11 is a graph for showing relationships between the correlation coefficients and the remaining time until a failure is caused which are obtained when the generation of the accumulated matter on the bearing is set as an abnormality factor in the first embodiment of the present invention. Specifically, in FIG. 11, correspondence relationships between the remaining time until a failure is caused and each of the correlation coefficient $a_{12}$ corresponding to the slope and the correlation coefficient $b_{12}$ corresponding to the intercept are shown.

The alarm determination time t_alarm is set, to thereby be able to determine correlation coefficients a_alarm and b_alarm at t_alarm. When the generation of the accumulated matter on the bearing is set as the abnormality factor, the correlation coefficient $a_{12}$ increases and the correlation coefficient $b_{12}$ decreases as the remaining time until a failure is caused becomes shorter. From this fact, the diagnosis unit 44 can obtain the remaining time corresponding to the correlation coefficient $a_{12}$ and the correlation coefficient $b_{12}$.

In addition, the diagnosis unit 44 can issue the abnormality notification when:
$a_{12}$>a_alarm, or
$b_{12}$<b_alarm.

Of two or more feature parameters, the average and the variance have been used as examples of the two feature parameters to be used for the correlation function. However, other than those, when there is a correlation having correlation coefficients changed in accordance with the anomaly factor 50, a combination of other feature parameters can be used to perform the abnormality diagnosis and life span calculation.

Next, a vacuum leak in the load 20 is described as a specific example of quantitatively performing the abnormality diagnosis of the load 20 based on the correlation coefficients. When a vacuum leak occurs, a load on the electric motor 10 increases in order to maintain the same degree of vacuum. Therefore, the average value of the current in the electric motor 10 increases. Meanwhile, even when a vacuum leak occurs, there is no change in terms of a change in current over time. Therefore, the variance of the current is constant.

Figure 12:
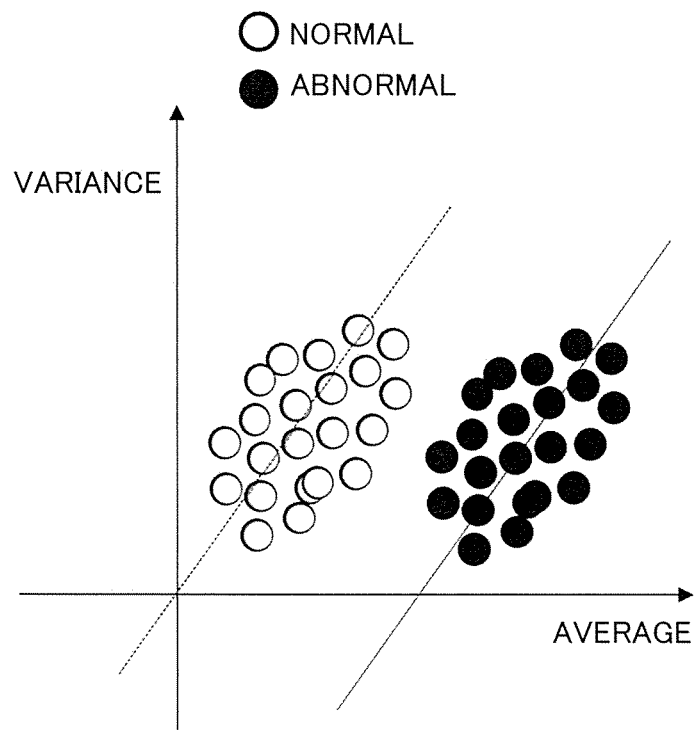
FIG. 12 is a graph for showing correlations between the average and the variance of the current values obtained at the normal operation and at the time of an occurrence of a vacuum leak in a load in the first embodiment of the present invention.

FIG. 12 is a graph for showing correlations between the average and the variance of the current values obtained at the normal operation and at the time of the occurrence of a vacuum leak in the load 20 in the first embodiment of the present invention. Referring to FIG. 12, when a vacuum leak occurs, as the remaining time until a failure is caused becomes shorter, the correlation coefficient $b_{12}$ corresponding to the intercept of the linear function becomes smaller, but the correlation coefficient $a_{12}$ corresponding to the slope of the linear function is constant.

Therefore, the diagnosis unit 44 can obtain the remaining time corresponding to the correlation coefficient $a_{12}$ and the correlation coefficient $b_{12}$. In addition, the diagnosis unit 44 can issue the abnormality notification when:
$b_{12}$<b_alarm.

As described above, examples of the abnormal part include the generation of the accumulated matter on the bearing relating to the electric motor 10 and the vacuum leak relating to the load 20. The two or more feature parameters to be used for the correlation function and change amounts of the correlation coefficients are different depending on each abnormal part.

In consideration of this, the diagnosis unit 44 employs two or more appropriate feature parameters for each abnormal part to calculate the correlation coefficients, and uses the alarm determination time t_alarm set for each abnormal part, to thereby be able to perform an appropriate abnormality diagnosis. As a result, it is possible to obtain an abnormality diagnosis device and an abnormality diagnosis method that are capable of appropriately diagnosing the remaining time until a failure is caused for each abnormal part and issuing an abnormality notification at a desired timing.

Second Embodiment

In the above-mentioned first embodiment, the case in which the abnormality diagnosis is performed through use of the current as the physical quantity has been described. Meanwhile, in a second embodiment of the present invention, a case in which an abnormality diagnosis is performed through use of a time derivative corresponding to a change amount of the current per unit time as the physical quantity is described. As a specific example, description is given of a case in which an abnormality diagnosis based on current measurement is performed on the MOCVD apparatus in the same manner as in the above-mentioned first embodiment.

In the second embodiment, the time differentiation of the current is performed on the current effective value. In the same manner as in the first embodiment, it is assumed that "n" current effective values I_effective are calculated as the current effective values $I\_effective_1$ to $I\_effective_n$ by the feature parameter calculation unit 42. In regard to the calculated current effective values I_effective, a time derivative $\Delta I\_effective_1$ of the first current is calculated by Expression (8).

$$\Delta I\_effective_1 = I\_effective_2 - I\_effective_1 \qquad (8)$$

The repetition of this calculation enables the feature parameter calculation unit 42 to calculate (n−1) time derivatives ΔI_effective from time-series data on the "n" current effective values I_effective.

The abnormality diagnosis device according to the second embodiment performs the abnormality diagnosis through use of the time derivative ΔI_effective. As an example in which it is effective to perform the abnormality diagnosis through use of the time derivative, there is a failure of a vacuum valve. The vacuum valve is opened and closed when the vacuum chamber of the MOCVD apparatus is subjected to vacuuming. When the vacuum valve is opened and closed, the load on the electric motor 10 increases in accordance with the degree of opening and closing. Therefore, the current value of the electric motor 10 also increases.

The vacuum valve is opened and closed in a continuous manner Therefore, the increase in current value also changes over time in accordance with the degree of opening and closing. Now, consideration is given to a case in which an abnormality has occurred in the vacuum valve. For example, when an abnormality of an opening/closing speed decreasing due to wear occurs in the vacuum valve, the time derivative of the current decreases. Further, when a crack occurs in a portion of the vacuum valve, the opening/closing speed becomes unstable, and the variance of the time derivative of the current increases. For the above-mentioned reasons, attention is given to the time derivative of the current, to thereby be able to appropriately perform an abnormality diagnosis of the vacuum valve for each abnormal part.

Third Embodiment

In the above-mentioned first and second embodiments, the case in which the abnormality diagnosis is performed through use of the current as the physical quantity has been described in detail. In a third embodiment of the present invention, an abnormality diagnosis using a plurality of physical quantities is described. Description is given of a case in which an abnormality diagnosis of the vacuum pump is performed in the same manner as in the first and second embodiments.

The vacuum pump also causes a change in physical quantity other than the current when an abnormality occurs. For example, an increase of the accumulated matter on the bearing causes changes in average value and variance of the current, but the average value and the variance of the vibrations of the electric motor 10 also increase due to the accumulated matter hindering the rotation of the bearing.

In addition, when an airflow during the vacuuming changes due to the increase of the accumulated matter, the variance value of the temperature relating to the electric motor 10 increases, and the vibrations of the electric motor 10 also increase. Then, as the variance value of the temperature and the vibrations increase, the average value of sound increases as well. Therefore, not only the current but also feature parameters based on a plurality of physical quantities including the temperature, vibrations, and sound can be employed depending on the abnormal part. As a specific abnormality diagnosis method using each of the feature parameters, the same method as those in the first and second embodiments can be applied.

As a result, the abnormality diagnosis using a plurality of physical quantities is executed, to thereby be able to perform the abnormality diagnosis with improved reliability for each abnormal part.

Figure 13:
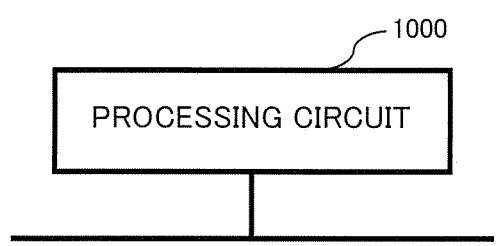
FIG. 13 is a configuration diagram for illustrating a case in which each function of the abnormality diagnosis device according to each of the first to third embodiments of the present invention is implemented by a processing circuit being dedicated hardware.
Figure 14:
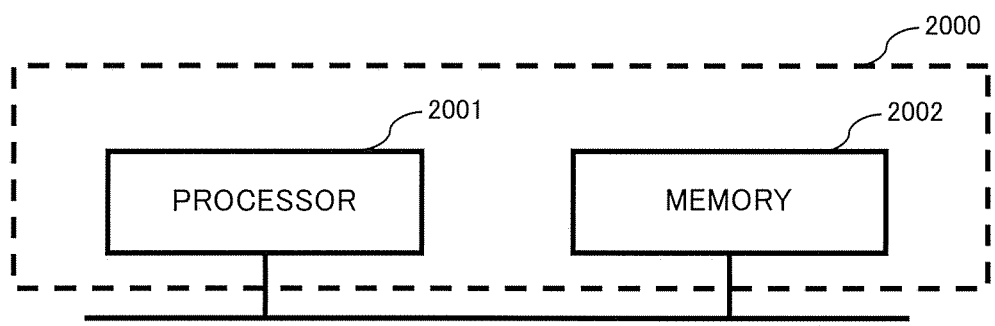
FIG. 14 is a configuration diagram for illustrating a case in which each function of the abnormality diagnosis device according to each of the first to third embodiments of the present invention is implemented by a processing circuit including a processor and a memory.

Each of the functions of the abnormality diagnosis device according to each of the first to third embodiments described above is implemented by a processing circuit. The processing circuit for implementing each of the functions may be dedicated hardware, or a processor configured to execute a program stored in a memory. FIG. 13 is a configuration diagram for illustrating a case in which each function of the abnormality diagnosis device according to each of the first to third embodiments of the present invention is implemented by a processing circuit 1000 being dedicated hardware. FIG. 14 is a configuration diagram for illustrating a case in which each function of the abnormality diagnosis device according to each of the first to third embodiments of the present invention is implemented by a processing circuit 2000 including a processor 2001 and a memory 2002.

When the processing circuit is dedicated hardware, the processing circuit 1000 corresponds to, for example, a single circuit, a composite circuit, a programmed processor, a parallel-programmed processor, an application specific integrated circuit (ASIC), a field programmable gate array (FPGA), or a combination thereof. Each of the functions of the physical quantity measurement unit 41, the feature parameter calculation unit 42, the correlation function creation unit 43, and the diagnosis unit 44 which are illustrated in FIG. 1 may be implemented by each individual processing circuit 1000. In another case, the functions of the above-mentioned units are collectively implemented by the processing circuit 1000.

Meanwhile, when the processing circuit is the processor 2001, each of the functions of the physical quantity measurement unit 41, the feature parameter calculation unit 42, the correlation function creation unit 43, and the diagnosis unit 44 is implemented by software, firmware, or a combination of software and firmware. The software and the firmware are coded as a program and stored in the memory 2002. The processor 2001 reads out and executes the program stored in the memory 2002, to thereby implement the function of each of the units. That is, the abnormality diagnosis device includes the memory 2002 configured to store programs the execution of which by the processing circuit 2000 ultimately leads to the execution of Step S201 to Step S207 illustrated in FIG. 2 as an example.

It is also understood that those programs cause a computer to execute the steps and methods described above for the respective units. In this case, the memory 2002 corresponds to, for example, a random access memory (RAM), a read only memory (ROM), a flash memory, an erasable programmable read only memory (EPROM), an electrically erasable and programmable read only memory (EEPROM), or other such non-volatile or volatile semiconductor memory. The memory 2002 also corresponds to, for example, a magnetic disk, a flexible disk, an optical disc, a compact disc, a MiniDisk, or a DVD.

Some of the functions of the respective units described above may be implemented by dedicated hardware, and others thereof may be implemented by software or firmware.

In this manner, the processing circuit can implement the function of each of the units described above by hardware, software, firmware, or a combination thereof.

REFERENCE SIGNS LIST 10 electric motor, 20 load, 40 abnormality diagnosis device, 41 physical quantity measurement unit, 42 feature parameter calculation unit, 43 correlation function creation unit, 44 diagnosis unit, 45 database unit

The invention claimed is:

1. An abnormality diagnosis device, comprising:
a physical quantity measurement processor configured to acquire, as time-series data, a measured value of a physical quantity that changes depending on an abnormality occurrence state of an electric motor or a load;
a feature parameter calculation processor configured to calculate two or more feature parameters based on the physical quantity acquired as the time-series data;
a correlation function creation processor configured to create a correlation function for each of two or more feature parameters included in the two or more feature parameters through use of a plurality of calculation results obtained through repeated calculation regarding the two or more feature parameters, and calculate from the correlation function a correlation coefficient corresponding to a measurement result, of the physical quantity that changes depending on the abnormality occurrence state;
a database configured to store in advance reference data in which a remaining time until the electric motor or the load causes a failure and the correlation coefficient are associated with each other; and
a diagnosis processor configured to extract from the reference data the remaining time corresponding to the correlation coefficient calculated by the correlation function creation processor, and identify the remaining time until the electric motor or the load causes a failure or a part that has caused a failure, to thereby perform an abnormality diagnosis of the electric motor or the load,
wherein the correlation function creation processor employs two or more appropriate feature parameters for each abnormal part to calculate the correlation coefficients individually,
wherein the database is configured to store the reference data individually for each part of the electric motor or the load to be subjected to the abnormality diagnosis, and
wherein the diagnosis processor is configured to identify the remaining time until a failure is caused for each part of the electric motor or the load to be subjected to the abnormality, diagnosis through use of the correlation coefficients calculated individually and the reference data stored individually.

2. The abnormality diagnosis device according to claim 1, wherein the reference data is data which is obtained from a relationship between an abnormal amount of each part acquired in advance and the correlation coefficient and a relationship between the abnormal amount and the remaining time until the electric motor or the load causes a failure and in which the correlation coefficient and the remaining time are associated with each other.

3. The abnormality diagnosis device according to claim 2, wherein the feature parameter calculation processor is configured to calculate the two or more feature parameters based on a value obtained by performing a time differentiation on the physical quantity acquired as the time-series data.

4. The abnormality diagnosis device according to claim 2,
wherein the physical quantity measurement processor is configured to acquire, as the physical quantity, time-series data for each of a plurality of physical quantities,
wherein the feature parameter calculation processor is configured to calculate two or more feature parameters for each of the plurality of physical quantities,
wherein the correlation function creation processor is configured to calculate the correlation coefficient for each of the plurality of physical quantities, and
wherein the diagnosis processor is configured to perform the abnormality diagnosis based on the remaining time identified for each of the plurality of physical quantities.

5. The abnormality diagnosis device according to claim 4, wherein the diagnosis processor is configured to output an alarm when the identified remaining time becomes equal to or less than an alarm determination time set in advance.

6. The abnormality diagnosis device according to claim 2, wherein the diagnosis processor is configured to output an alarm when the identified remaining time becomes equal to or less than an alarm determination time set in advance.

7. The abnormality diagnosis device according to claim 1,
wherein the physical quantity measurement processor is configured to acquire, as the physical quantity, time-series data for each of a plurality of physical quantities,
wherein the feature parameter calculation processor is configured to calculate two or more feature parameters for each of the plurality of physical quantities,
wherein the correlation function creation processor is configured to calculate the correlation coefficient for each of the plurality of physical quantities, and
wherein the diagnosis processor is configured to perform the abnormality diagnosis based on the remaining time identified for each of the plurality of physical quantities.

8. The abnormality diagnosis device according to claim 7, wherein the diagnosis processor is configured to output an alarm when the identified remaining time becomes equal to or less than an alarm determination time set in advance.

9. The abnormality diagnosis device according to claim 1, wherein the diagnosis processor is configured to output an alarm when the identified remaining time becomes equal to or less than an alarm determination time set in advance.

10. An abnormality diagnosis method, comprising the steps of:
acquiring, as time-series data, a measured value of a physical quantity that changes depending on an abnormality occurrence state of an electric motor or a load;
calculating two or more feature parameters based on the physical quantity acquired as the time-series data;
creating a correlation function for each of two or more feature parameters included in the two or more feature parameters, through use of a plurality of calculation results obtained through repeated calculation regarding the two or more feature parameters, and calculating from the correlation function a correlation coefficient corresponding to a measurement result of the physical quantity that changes depending on the abnormality occurrence state;

causing a database to store in advance reference data in which a remaining time until the electric motor or the load causes a failure and the correlation coefficient are associated with each other; and performing an abnormality diagnosis of the electric motor or the load by extracting from the reference data the remaining time corresponding to the correlation coefficient calculated in the step of calculating a correlation coefficient and identifying the remaining time until the electric motor or the load causes a failure or a part that has caused a failure, wherein the step of calculating from the correlation function a correlation coefficient employs two or more appropriate feature parameters for each abnormal part to calculate the correlation coefficients individually, wherein the reference data is stored in the database individually for each part of the electric motor or the load to be subjected to the abnormality diagnosis, and wherein the step of performing an abnormality diagnosis includes identifying the remaining time until a failure is caused for each part of the electric motor or the load to be subjected to the abnormality diagnosis through use of the correlation coefficients calculated individually and the reference data stored individually.

11. An abnormality diagnosis device, comprising:

a physical quantity measurement processor configured to acquire, as time-series data, a measured value of a physical quantity that changes depending on an abnormality occurrence state of an electric motor or a load;

a feature parameter calculation processor configured to calculate two or more feature parameters based on the physical quantity acquired as the time-series data;

a correlation function creation processor configured to create a correlation function for each of two or more feature parameters included in the two or more feature parameters through use of a plurality of calculation results obtained through repeated calculation regarding the two or more feature parameters, and calculate from the correlation function a correlation coefficient corresponding to a measurement result of the physical quantity that changes depending on the abnormality occurrence state;

a database configured to store in advance reference data in which a remaining time until the electric motor or the load causes a failure and the correlation coefficient are associated with each other; and a diagnosis processor configured to extract from the reference data the remaining time corresponding to the correlation coefficient calculated by the correlation function creation processor, and identify the remaining time until the electric motor or the load causes a failure or a part that has caused a failure, to thereby perform an abnormality diagnosis of the electric motor or the load, wherein the database is configured to store the reference data individually for each part of the electric motor or the load to be subjected to the abnormality diagnosis, wherein the diagnosis processor is configured to identify the remaining time until a failure is caused for each part of the electric motor or the load to be subjected to the abnormality diagnosis through use of the reference data stored individually, and wherein the feature parameter calculation processor is configured to calculate the two or more feature parameters based on a value obtained by performing a time differentiation on the physical quantity acquired as the time-series data.

12. The abnormality diagnosis device according to claim 11, wherein the physical quantity measurement processor is configured to acquire, as the physical quantity, time-series data for each of a plurality of physical quantities, wherein the feature parameter calculation processor is configured to calculate two or more feature parameters for each of the plurality of physical quantities, wherein the correlation function creation processor is configured to calculate the correlation coefficient for each of the plurality of physical quantities, and wherein the diagnosis processor is configured to perform the abnormality diagnosis based on the remaining time identified for each of the plurality of physical quantities.

13. The abnormality diagnosis device according to claim 12, wherein the diagnosis processor is configured to output an alarm when the identified remaining time becomes equal to or less than an alarm determination time set in advance.

14. The abnormality diagnosis device according to claim 11, wherein the diagnosis processor is configured to output an alarm when the identified remaining time becomes equal to or less than an alarm determination time set in advance.

15. The abnormality diagnosis device according to claim 11, wherein the reference data is data which is obtained from a relationship between an abnormal amount of each part acquired in advance and the correlation coefficient and a relationship between the abnormal amount and the remaining time until the electric motor or the load causes a failure and in which the correlation coefficient and the remaining time are associated with each other.

16. The abnormality diagnosis device according to claim 15, wherein the physical quantity measurement processor is configured to acquire, as the physical quantity, time-series data for each of a plurality of physical quantities, wherein the feature parameter calculation processor is configured to calculate two or more feature parameters for each of the plurality of physical quantities, wherein the correlation function creation processor is configured to calculate the correlation coefficient for each of the plurality of physical quantities, and wherein the diagnosis processor is configured to perform the abnormality diagnosis based on the remaining time identified for each of the plurality of physical quantities.

17. The abnormality diagnosis device according to claim 16, wherein the diagnosis processor is configured to output an alarm when the identified remaining time becomes equal to or less than an alarm determination time set in advance.

18. The abnormality diagnosis device according to claim 15, wherein the diagnosis processor is configured to output an alarm when the identified remaining time becomes equal to or less than an alarm determination time set in advance.

* * * * *